United States Patent
Chen et al.

(10) Patent No.: US 12,422,086 B2
(45) Date of Patent: Sep. 23, 2025

(54) SUPPORTING BOLT, CANTILEVER SUPPORTING STRUCTURE AND CONDUCTING DEVICE

(71) Applicant: Fulian Precision Electronics (Tianjin) Co., LTD., Tianjin (CN)

(72) Inventors: Hung-Wei Chen, New Taipei (TW); Tzu-Yao Weng, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 163 days.

(21) Appl. No.: 18/380,600

(22) Filed: Oct. 16, 2023

(65) Prior Publication Data
US 2024/0384828 A1 Nov. 21, 2024

(30) Foreign Application Priority Data
May 15, 2023 (CN) .......................... 202310547057.2

(51) Int. Cl.
*F16M 11/04* (2006.01)
(52) U.S. Cl.
CPC ................................... *F16M 11/04* (2013.01)
(58) Field of Classification Search
CPC .. F16B 37/0857; F16B 5/0208; F16B 5/0266; H01L 2023/4043; H01L 2023/4068; H05K 7/2049
See application file for complete search history.

(56) References Cited

U.S. PATENT DOCUMENTS

| | | | | |
|---|---|---|---|---|
| 6,347,038 B1 * | 2/2002 | Duarte | ................. | H05K 3/0061 361/705 |
| 8,393,840 B2 * | 3/2013 | Chiu | .................... | F16B 5/0266 411/353 |
| 8,794,889 B2 * | 8/2014 | Aukzemas | ............. | F16B 31/04 411/107 |
| 9,113,567 B2 * | 8/2015 | Stotz, Jr. | .................. | H05K 7/12 |
| 11,284,539 B2 * | 3/2022 | Zhang | .................. | H05K 7/2049 |
| 12,052,823 B2 * | 7/2024 | Wu | ....... | H05K 7/1417 |
| 12,085,117 B2 * | 9/2024 | Zhang | .................. | F16B 5/0208 |
| 2012/0224935 A1 * | 9/2012 | Chiu | .................... | F16B 5/0208 411/352 |
| 2012/0263555 A1 * | 10/2012 | Wang | ................... | F16B 5/0266 411/337 |

FOREIGN PATENT DOCUMENTS

| | | |
|---|---|---|
| CN | 103930722 A | 7/2014 |
| TW | M368726 U * | 11/2009 |

* cited by examiner

*Primary Examiner* — Bradley Duckworth
(74) *Attorney, Agent, or Firm* — ScienBiziP, P.C.

(57) ABSTRACT

Disclosed in the present disclosure is a supporting bolt, a cantilever supporting structure and a conducting device. The supporting bolt includes a locking screw, a support screw sleeve, and an elastic supporting member. The locking screw is fixedly connected the pressure receiving structure. The support screw sleeve is fixedly connected the pressure applying structure and is slidably disposed on an outer surface of the locking screw along a direction of the central axis within a sliding range. The elastic supporting member includes a first elastic member, a first end of the first elastic member is compressed against the support screw sleeve, and a second end of the first elastic member is compressed against the pressure receiving structure, the first elastic member has an elastic force along the pressure receiving structure towards the pressure applying structure to support the pressure applying structure.

20 Claims, 5 Drawing Sheets

SUPPORTING BOLT, CANTILEVER SUPPORTING STRUCTURE AND CONDUCTING DEVICE

FIELD

The present disclosure relates to the technical field of cantilever support structure, and in particular relates to a supporting bolt, a cantilever supporting structure, and a conducting device.

BACKGROUND

In various situations where two objects need to be affixed flatly, the pressure receiving object needs to achieve uniform pressure distribution, avoiding the uneven pressure of the pressure applying object which may lead to the destruction of the pressure applying object by excessive force on one side. When there is a need to conduct electricity or heat, avoid problems that may result in poor electrical or thermal conduction between the pressure receiving object and the pressure applying object. The pressure applying object often utilizes the surrounding spring screws to apply equal pressure to the pressure receiving object, thereby achieving uniform pressure to improve the above problems.

In related technology, the pressure applying object is often symmetrical style, the use of the surrounding spring screws that can easily achieve the demand for uniform pressure. Due to the uneven distribution of the mass of the pressure applying object, the gravity of the pressure applying object is unevenly distributed on the surface of the pressure receiving object, so that the pressure between the pressure applying object and the pressure receiving object is uneven, which can easily lead to the destruction of the pressure receiving object by excessive force on one side, or the problem of poor electrical and thermal conduction.

Therefore, improvement is desired.

DETAILED DESCRIPTION

The technical solutions in the embodiments of the present disclosure will be described below in conjunction with the accompanying drawings in the embodiments of the present disclosure, and it is clear that the embodiments described are only a portion of the embodiments of the present disclosure and not all of them.

It should be noted that when an element is considered to be "connected" to another element, it may be directly connected to the other element or there may be both centered elements. When an element is considered to be "disposed on" another element, it may be disposed directly on the other element or there may be both centered elements.

In the description of the embodiments of the present disclosure, the technical terms "first", "second" and the like are only used to distinguish different objects, and are not to be construed as indicating or implying relative importance, or implicitly specifying the number, specific order, or primary-secondary relationship of the indicated technical features. In the description of the embodiments of the present disclosure, "more than one" means more than two, unless otherwise expressly and specifically limited.

Figure 1:
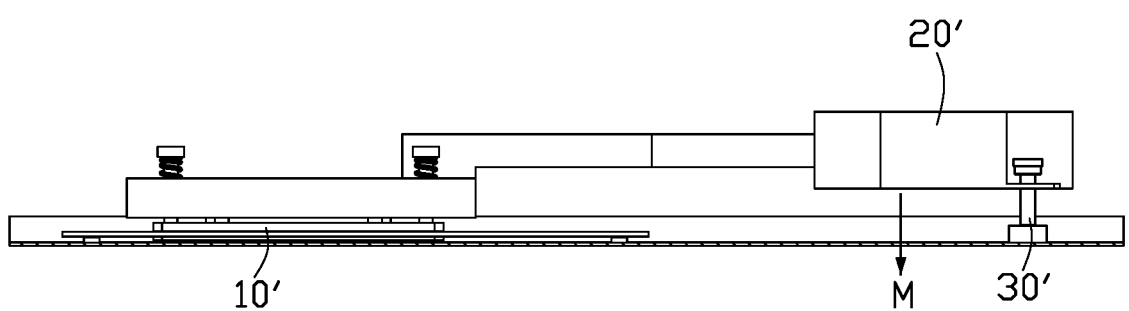
FIG. 1 is a side sectional view of a cantilever supporting structure according to an embodiment of the present disclosure.

FIG. 1 illustrates a cantilever supporting structure 100'. When a pressure applying structure 20' is pressed against a pressure receiving structure 10' and secured by a locking bolt 30', and the pressure applying structure 20' is asymmetric, due to the uneven distribution of the mass of the pressure applying structure 20' itself, the gravitational force of the pressure applying structure 20' itself is unevenly distributed on the surface of the pressure receiving structure 10', and a torsional moment M is thus present, which leads to an uneven pressure between the pressure applying structure 20' and the pressure receiving structure 10'.

In order to make the purpose, technical solutions and advantages of the present disclosure clearer, the following will describe the embodiments of the present disclosure in further detail in conjunction with the accompanying drawings.

In one embodiment, a supporting bolt is disposed on one side where the center of gravity of the pressure applying structure is shift, and the supporting bolt supports the side where the center of gravity of the pressure applying structure is shift, thereby balancing the moment generated by the gravity of the pressure applying structure, and ameliorating the uneven distribution of the gravity of the pressure applying structure itself across the surface of the pressure receiving structure.

Figure 2:
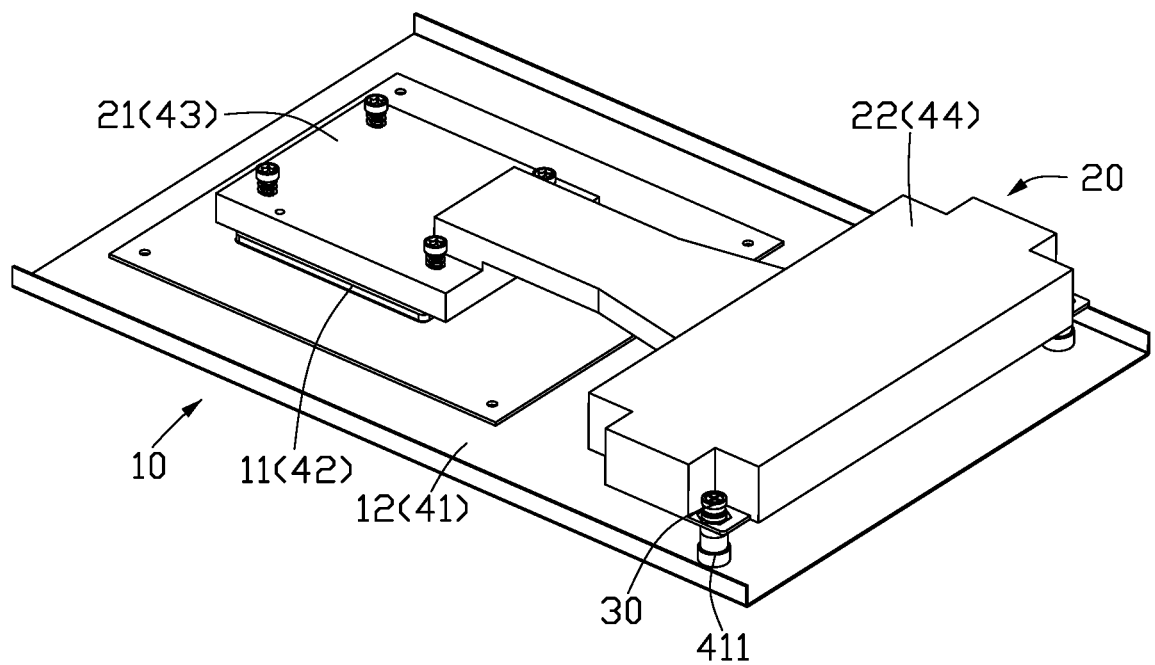
FIG. 2 is a schematic diagram of the cantilever supporting structure according to an embodiment of the present disclosure.
Figure 3:
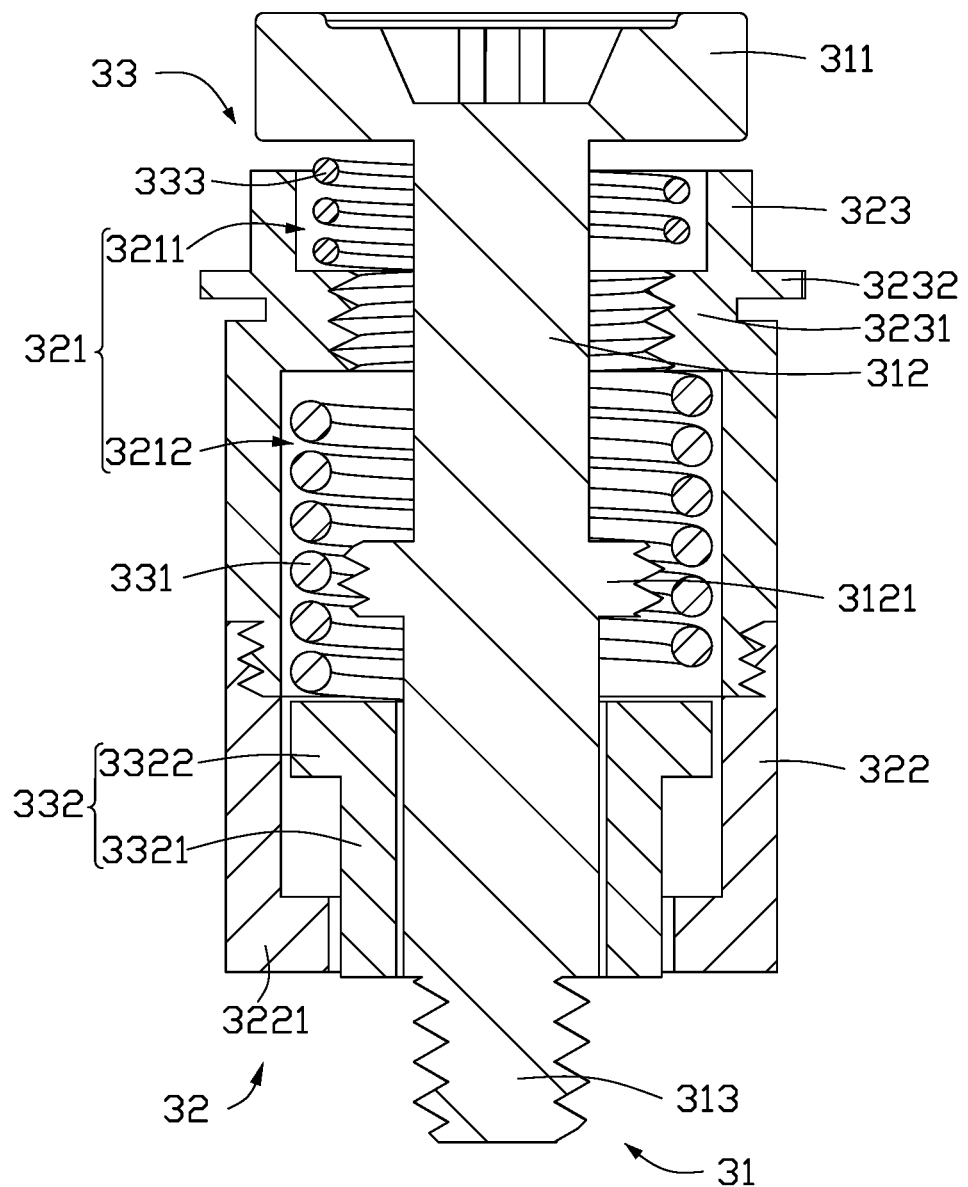
FIG. 3 is a cross-sectional view of the cantilever supporting structure in a locked state according to an embodiment of the present disclosure.

FIGS. 2 and 3 illustrate a supporting bolt 30 in accordance with an embodiment of the present disclosure.

The supporting bolt 30 is used to secure to a pressure receiving structure 10 to support a pressure applying structure 20. The supporting bolt 30 includes a locking screw 31, a support screw sleeve 32, and an elastic supporting member 33. The locking screw 31 is used to fixedly connect the pressure receiving structure 10, and the support screw sleeve 32 is used to fixedly connect the pressure applying structure 20. The locking screw 31 has a central axis, and the support screw sleeve 32 is slidably disposed on the outer surface of the locking screw 31 along the direction of the central axis within the sliding range. The screw cap portion 311 forms a barrier with the top of the sleeve support screw sleeve 32, thereby limiting the upward travel of the support screw sleeve 32. The sliding range of the support screw sleeve 32 refers to a range between the screw cap portion 311 and the pressure receiving structure 10 of the support screw sleeve 32.

Referring to FIGS. 2 and 3, an elastic supporting member 33 is disposed between the pressure receiving structure 10 and the support screw sleeve 32, one end of the elastic supporting member 33 is pressed against the support screw sleeve 32, and another end of the elastic supporting member 33 is used to press against the pressure receiving structure 10. The elastic supporting member 33 has an elastic force along the pressure receiving structure 10 toward the pressure applying structure 20. Since the support screw sleeve 32 is fixedly connected to the pressure applying structure 20, the elastic supporting member 33 can be configured for the moment generated by the pressure applying structure 20 due to the center of gravity shift, it is possible to improve the occurrence of uneven pressure between the pressure applying structure 20 and the pressure receiving structure 10, and to avoid excessive force on one side of the pressure receiving structure 10.

Referring to FIGS. 2 and 3, in one embodiment, the locking screw 31 includes a screw cap portion 311, a screw rod portion 312, and a stud portion 313 from top to bottom. The stud portion 313 is used for threaded connection of the pressure receiving structure 10, and the support screw sleeve 32 is slidably disposed on the screw rod portion 312. The diameter of the screw rod portion 312 is greater than the maximum outer diameter of the stud portion 313. After the stud portion 313 is fully threaded with the pressure receiving structure 10, a resistance can be formed between the end surface of the screw rod portion 312 near the stud portion 313 and the pressure receiving structure 10 to limit the locking screw 31, so that the locking screw 31 has a clear locking position, thereby improving the inconsistent locking torque of the operator for the locking screw 31 and avoiding the problem of unilateral stress caused by the locking screw 31 compressing the pressure applying structure 20.

Referring to FIG. 3, in one embodiment, the support screw sleeve 32 includes a first screw sleeve 322 and a second screw sleeve 323, the first screw sleeve 322 and the second screw sleeve 323 are detachably connected, and an accommodating cavity 321 is formed between the first screw sleeve 322 and the second screw sleeve 323. The end surface of the first screw sleeve 322 away from the second screw sleeve 323 is equipped with a first inter annular table 3221. The inner wall of the second screw sleeve 323 is equipped with a second inter annular table 3231. The first inter annular table 3221 and the second inter annular table 3231 are both located in the accommodating cavity 321. The second inter annular table 3231 divides the accommodating cavity 321 into a top cavity 3211 and a bottom cavity 3212.

In one embodiment, the outer surface of the second screw sleeve 323 is equipped with a riveting table 3232, the riveting table 3232 is fixedly connected to the pressure applying structure 20 through the riveting table 3232.

In one embodiment, the first screw sleeve 322 and the second screw sleeve 323 are connected through thread engagement, so that the support screw sleeve 32 can be disassembled and assembled by rotating the first screw sleeve 322 or the second screw sleeve 323.

Referring to FIG. 3, in one embodiment, the elastic supporting member 33 includes a first elastic member 331 and a limiting sleeve 332, the limiting sleeve 332 is slidably disposed in the bottom cavity 3212 relative to the support screw sleeve 32, and the first elastic member 331 is located inside the bottom cavity 3212 and on the outer circumference of the locking screw 31. During deformation of the first elastic member 331, the inner wall of the bottom cavity 3212 can limit the first elastic member 331, so as to ameliorate the problem of the first elastic member 331 twisting or detaching from the support screw sleeve 32 during the deformation process. One end of the first elastic member 331 is pressed against the second inter annular table 3231, and another end of the first elastic member 331 is pressed against the limiting sleeve 332, the limiting sleeve 332 is used to press against the pressure receiving structure 10. In contrast to the first elastic member 331 being pressed directly against the pressure receiving structure 10, the first elastic member 331 is pressed against the pressure receiving structure 10 through a limiting sleeve 332.

Referring to FIG. 3, in one embodiment, the limiting sleeve 332 includes a contact portion 3321 and a limiting portion 3322. The limiting portion 3322 is slidably disposed in a cavity wall of the bottom cavity 3212, and the contact portion 3321 is used to press against the pressure receiving structure 10. The end of the first elastic member 331 away from the second inter annular table 3231 is pressed against the limiting portion 3322. The maximum width of the limiting portion 3322 is greater than the inner diameter of the ring of the first inter annular table 3221 to allow the limiting portion 3322 to form a resistance with the first inter annular table 3221, to limit the first elastic member 331 and the limiting portion 3322 from disengaging from the bottom cavity 3212, and to ameliorate the problem of the first elastic member 331 and the limiting sleeve 332 separating from the support screw sleeve 32 during transportation or installation. In the present disclosure, the first inter annular table 3221 is disposed on the first screw sleeve 322, the second inter annular table 3231 is disposed on the second screw sleeve 323, and the first screw sleeve 322 and the second screw sleeve 323 can be detachably connected, so that the first screw sleeve 322 and the second screw sleeve 323 can be separated and the first elastic member 331 and the limiting sleeve 332 can be installed, and then the first screw sleeve 322 and the second screw sleeve 323 can be connected, thereby improving the installation convenience and position stability of the first elastic member 331 and the limiting sleeve 332.

Referring to FIG. 3, in one embodiment, the outer wall of the screw rod portion 312 is equipped with a screw outer annular table 3121, the outer surface of the screw outer annular table 3121 is equipped with external threads, the inner wall of the second inter annular table 3231 is equipped with internal threads, and the screw outer annular table 3121 is threaded with the second inter annular table 3231. When it is necessary to install the locking screw 31 with the support screw sleeve 32, by threading the screw rod portion 312 from the top cavity 3211 into the second inter annular table 3231 and rotating the locking screw 31, and the screw outer annular table 3121 is threadedly engaged with the second inter annular table 3231 from above the second inter annular table 3231. The locking screw 31 can be further rotated to separate the screw outer annular table 3121 from the second inter annular table 3231 and enter the bottom cavity 3212, thereby completing the installation of the locking screw 31 and the support screw sleeve 32. After the installation of the locking screw 31 and the support screw sleeve 32 is completed, when the thread line at the bottom of the second inter annular table 3231 is pressed against the thread line at the top of the screw outer annular table 3121, due to the self-locking effect of the thread, the second inter annular table 3231 can limit the position of the screw outer annular table 3121, in order to improve the problem of separation between the locking screw 31 and the support screw sleeve 32 during transportation or installation.

Figure 4:
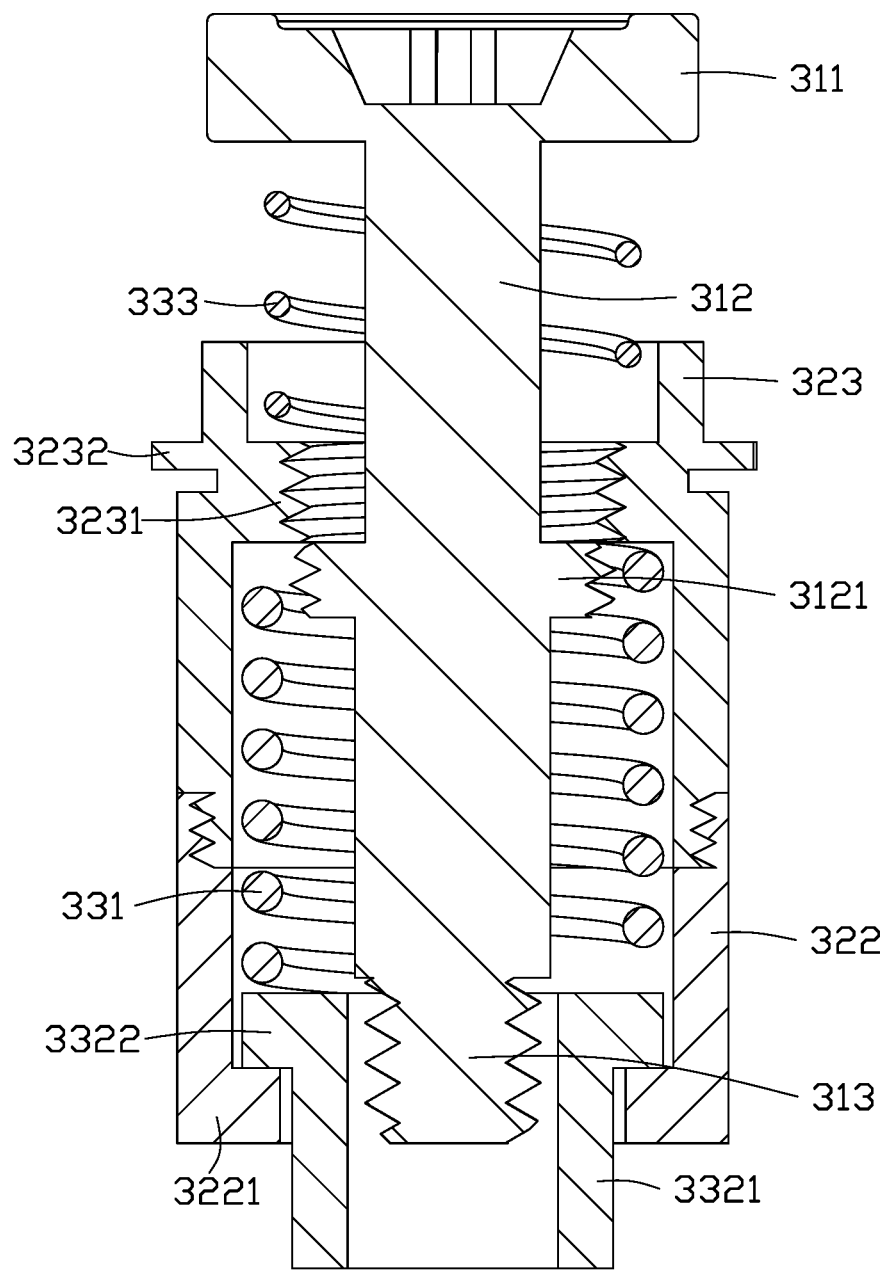
FIG. 4 is a cross-sectional view of the cantilever supporting structure in an unlocked state according to an embodiment of the present disclosure.

Referring to FIGS. 3 and 4, in one embodiment, the elastic supporting member 33 further includes a second elastic member 333, the second elastic member 333 is installed on the outer surface of the screw rod portion 312, and the second elastic member 333 is located in the top cavity 3211. One end of the second elastic member 333 is pressed against the bottom surface of the screw cap portion 311, and another end of the second elastic member 333 is pressed against the top surface of the second inter annular table 3231. The second elastic member 333 has an elastic force that drives the screw cap portion 311 away from the limiting sleeve 332, so that when the supporting bolt 30 is not installed with the pressure receiving structure 10, the stud portion 313 of the locking screw 31 can be inserted into the contact portion 3321 of the limiting sleeve 332. During the installation process of the supporting bolt 30 and the pressure receiving structure 10, the problem of interference caused by the extension of the stud portion 313 of the locking screw 31 and the inconvenience of adjusting the lateral position of the pressure applying structure 20 can be avoided.

Referring to FIG. 2, an embodiment of the present disclosure provides a cantilever supporting structure 100. The cantilever supporting structure 100 includes a pressure receiving structure 10, a pressure applying structure 20, and a supporting bolt 30. The pressure receiving structure 10 includes a pressure receiving plate 11 and an installing plate 12. The pressure receiving plate 11 is fixed in the installing plate 12. The pressure applying structure 20 includes a pressure applying plate 21 and a cantilever 22. The cantilever 22 is fixed on the side of the pressure applying plate 21 to make the pressure applying structure 20 asymmetric as a whole, thereby causing the center of gravity to shift. The pressure applying plate 21 is pressed tightly against the pressure receiving plate 11, the supporting bolt 30 is disposed between the installing plate 12 and the cantilever 22, the locking screw 31 is fixed to the installing plate 12, and the support screw sleeve 32 is fixed to the cantilever 22, thereby balancing the moment generated by the gravity of the cantilever 22, improving the uneven pressure between the asymmetric style pressure applying structure 20 and the pressure receiving structure 10, resulting in the problem of excessive force on one side of the pressure receiving structure 10.

Figure 5:
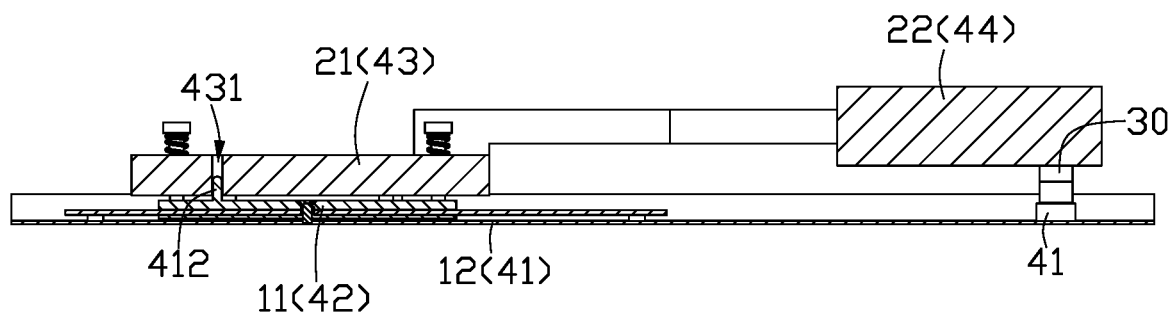
FIG. 5 is a cross-sectional view of a conducting device according to an embodiment of the present disclosure.

Referring to FIGS. 2 and 5, an embodiment of the present disclosure provides a conducting device 40. The conducting device 40 includes a bottom plate 41, a conducting source 42, a contact plate 43, a conducting plate 44, and a supporting bolt 30. The conducting source 42 is fixed on the bottom plate 41, and the conducting plate 44 is fixed on the side edge of the contact plate 43 to make the overall asymmetry between the conducting plate 44 and the contact plate 43, causing the center of gravity to shift.

In one embodiment, the conducting source 42 is the heat source, and the contact plate 43 is pressed tightly against the conducting source 42 to absorb the heat generated by the conducting source 42, the conducting plate 44 absorbs the heat from the contact plate 43, thereby achieving the function of heat dissipation for the conducting source 42. The heat source refers to a semiconductor component, such as a computer central processing unit (CPU), light-emitting diode (LED) beads, that partially converts electrical energy into thermal energy through a circuit with a resistor, or other forms of thermal energy accumulation.

In one embodiment, the conducting source 42 is the power source, and the contact plate 43 is pressed tightly against the conducting source 42 to transmit the current of the conducting source 42, the conducting plate 44 transmits the current of the contact plate 43, thereby achieving the function of conducting electricity to the conducting source 42.

In one embodiment, the bottom plate 41 is riveted with a riveting nut 411, the riveting nut 411 corresponds to the supporting bolt 30. The supporting bolt 30 is disposed between the bottom plate 41 and the conducting plate 44, and the locking screw 31 is threaded with the riveting nut 411. The riveting table 3232 on the outer surface of the support screw sleeve 32 is fixedly connected to the conducting plate 44 through riveting, so that the supporting bolt 30 supports the conducting plate 44, thereby balancing the moment generated by the heavy force of the conducting plate 44, and improving the uneven pressure between the contact plate 43 and the conducting source 42 and avoiding the problem of excessive force on one side of the conducting source 42.

Referring to FIG. 5, in one embodiment, the bottom plate bottom plate 41 is fixedly equipped with a positioning pin 412, and the side of the contact plate 43 facing the bottom plate 41 is provided with a positioning pin 431. The positioning pin 431 is matched with the positioning pin 412 to allow for easy alignment of the contact plate 43 and the conduction source conducting source 42 during pressing the contact plate 43 against the conducting source 42, thereby improving the installation efficiency of the conducting device 40.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A supporting bolt configured for securing to a pressure receiving structure to support a pressure applying structure, comprising:
   a locking screw configured for fixedly connecting the pressure receiving structure, the locking screw having a central axis;
   a support screw sleeve configured for fixedly connecting the pressure applying structure, the support screw sleeve slidably disposed on an outer surface of the locking screw along a direction of the central axis within a sliding range; and
   an elastic supporting member comprising a first elastic member and a limiting sleeve, the first elastic member disposed between the pressure receiving structure and the support screw sleeve,
   wherein a first end of the first elastic member is compressed against the support screw sleeve, and a second end of the first elastic member is compressed against the the limiting sleeve, the first elastic member is configured to apply an elastic force along the pressure receiving structure towards the pressure applying structure thereby supporting the pressure applying structure;
   wherein the support screw sleeve comprises an accommodating cavity, an inner wall of the accommodating cavity comprises a first inner annular table, the first inner annular table is disposed on an end surface of the support screw sleeve near the pressure receiving structure, the limiting sleeve comprises a contact portion and a limiting portion, the contact portion is pressed against the pressure receiving structure, and the limiting portion contacts with the first inner annular table to limit the limiting sleeve from detaching from the accommodating cavity.

2. The supporting bolt of claim 1, wherein the locking screw comprises a screw cap portion, a screw rod portion, and a stud portion, the stud portion is configured for a threaded connection to the pressure receiving structure, and a diameter of the screw rod portion is greater than a maximum outer diameter of the stud portion, the support screw sleeve is slidable along a direction of the central axis and is disposed on the screw rod portion, the screw cap portion is configured to stop the support screw sleeve from being away from the pressure receiving structure to limit the sliding range of the support screw sleeve.

3. The supporting bolt of claim 2, wherein the first elastic member is disposed in the accommodating cavity and is sleeved outside the locking screw, and the limiting sleeve is slidably disposed in the accommodating cavity, and the limiting sleeve is configured to press against the pressure receiving structure.

4. The supporting bolt of claim 3, wherein the inner wall of the accommodating cavity is provided with a second inner annular table, and the first elastic member is pressed against the support screw sleeve through the second inner annular table, the limiting portion is configured to transmit the elastic force of the first elastic member to the pressure receiving structure.

5. The supporting bolt of claim 4, wherein an outer wall of the screw rod portion is equipped with a screw outer annular table, the screw outer annular table is threaded with the second inner annular table.

6. The supporting bolt of claim 5, wherein the support screw sleeve comprises a first screw sleeve and a second screw sleeve, the first screw sleeve is detachably connected to the second screw sleeve, the accommodating cavity is formed between the first screw sleeve and the second screw sleeve, the first inner annular table is disposed on the first screw sleeve, and the second inner annular table is disposed on the second screw sleeve.

7. The supporting bolt of claim 5, wherein the elastic supporting member further comprises a second elastic member, the second elastic member is disposed on an outer surface of the screw rod portion, a first end of the second elastic member is pressed against the screw cap portion, and a second end of the second elastic member is pressed against the second inner annular table, and the second elastic member has an elastic force that drives the screw cap portion away from the limiting sleeve.

8. A cantilever supporting structure comprising:
a pressure receiving structure;
a pressure applying structure; and
a supporting bolt, comprising:
a locking screw configured for fixedly connecting the pressure receiving structure, the locking screw having a central axis;
a support screw sleeve configured for fixedly connecting the pressure applying structure, the support screw sleeve slidably disposed on an outer surface of the locking screw along a direction of the central axis within a sliding range; and
an elastic supporting member comprising a first elastic member and a limiting sleeve, the first elastic member disposed between the pressure receiving structure and the support screw sleeve,
wherein a first end of the first elastic member is compressed against the support screw sleeve, and a second end of the first elastic member is compressed against the the limiting sleeve, the first elastic member is configured to apply an elastic force along the pressure receiving structure towards the pressure applying structure thereby supporting the pressure applying structure, wherein the support screw sleeve comprises an accommodating cavity, an inner wall of the accommodating cavity comprises a first inner annular table, the first inner annular table is disposed on an end surface of the support screw sleeve near the pressure receiving structure, the limiting sleeve comprises a contact portion and a limiting portion, the contact portion is pressed against the pressure receiving structure, and the limiting portion contacts with the first inner annular table to limit the limiting sleeve from detaching from the accommodating cavity;

the pressure receiving structure comprises a pressure receiving plate and an installing plate, the pressure receiving plate is fixed to the installing plate, and the locking screw is fixedly connected to the installing plate, and the pressure applying structure comprises a pressure applying plate and a cantilever, the cantilever is fixed on a side edge of the pressure applying plate, the pressure applying plate is pressed tightly onto the pressure receiving plate, the cantilever is spaced with the installing plate, and the support screw sleeve is fixedly connected to the cantilever.

9. The cantilever supporting structure of claim 8, wherein the locking screw comprises a screw cap portion, a screw rod portion, and a stud portion, the stud portion is configured for a threaded connection to the pressure receiving structure, and a diameter of the screw rod portion is greater than a maximum outer diameter of the stud portion, the support screw sleeve is slidable along a direction of the central axis and is disposed on the screw rod portion, the screw cap portion is configured to stop the support screw sleeve from being away from the pressure receiving structure to limit the sliding range of the support screw sleeve.

10. The cantilever supporting structure of claim 9, wherein the first elastic member is disposed in the accommodating cavity and is sleeved outside the locking screw, and the limiting sleeve is slidably disposed in the accommodating cavity, and the limiting sleeve is configured to press against the pressure receiving structure.

11. The cantilever supporting structure of claim 10, wherein the inner wall of the accommodating cavity is provided with a second inner annular table, and the first elastic member is pressed against the support screw sleeve through the second inner annular table, the limiting portion is configured to transmit the elastic force of the first elastic member to the pressure receiving structure.

12. The cantilever supporting structure of claim 11, wherein an outer wall of the screw rod portion is equipped with a screw outer annular table, the screw outer annular table is threaded with the second inner annular table.

13. The cantilever supporting structure of claim 12, wherein the support screw sleeve comprises a first screw sleeve and a second screw sleeve, the first screw sleeve is detachably connected to the second screw sleeve, the accommodating cavity is formed between the first screw sleeve and the second screw sleeve, the first inner annular table is disposed on the first screw sleeve, and the second inner annular table is disposed on the second screw sleeve.

14. The cantilever supporting structure of claim 12, wherein the elastic supporting member further comprises a second elastic member, the second elastic member is disposed on an outer surface of the screw rod portion, a first end of the second elastic member is pressed against the screw cap portion, and a second end of the second elastic member is pressed against the second inner annular table, and the second elastic member has an elastic force that drives the screw cap portion away from the limiting sleeve.

15. A conducting device comprising a bottom plate, a conducting source, a contact plate, a conducting plate, and a supporting bolt,
wherein the supporting bolt comprises:
a locking screw configured for fixedly connecting a pressure receiving structure, the locking screw having a central axis;
a support screw sleeve configured for fixedly connecting a pressure applying structure, the support screw sleeve slidably disposed on an outer surface of the locking screw along a direction of the central axis within a sliding range; and an elastic supporting member comprising a first elastic member and a limiting sleeve, the first elastic member disposed between the pressure receiving structure and the support screw sleeve, wherein a first end of the first elastic member is compressed against the support screw sleeve, and a second end of the first elastic member is compressed against the the limiting sleeve, the first elastic member is configured to apply an elastic force along the pressure receiving structure towards the pressure applying structure thereby supporting the pressure applying structure, wherein the support screw sleeve comprises an accommodating cavity, an inner wall of the accommodating cavity comprises a first inner annular table, the first inner annular table is disposed on an end surface of the support screw sleeve near the pressure receiving structure, the limiting sleeve comprises a contact portion and a limiting portion, the contact portion is pressed against the pressure receiving structure, and the limiting portion contacts with the first inner annular table to limit the limiting sleeve from detaching from the accommodating cavity;

the conducting source is fixed to the bottom plate to jointly form the pressure receiving structure, the conducting plate is fixed on a side edge of the contact plate to jointly form the pressure applying structure, and the contact plate is tightly pressed against the conducting source, the conducting plate is spaced with the bottom plate, the locking screw is fixedly connected to the bottom plate, and the support screw sleeve is fixedly connected to the conducting plate.

16. The conducting device of claim 15, wherein the bottom plate is fixedly equipped with a positioning pin, and a side surface of the contact plate facing the bottom plate defines a positioning hole, the positioning hole is matched with the positioning pin to align the contact plate and the conducting source.

17. The conducting device of claim 15, wherein the locking screw comprises a screw cap portion, a screw rod portion, and a stud portion, the stud portion is configured for threaded connection to the pressure receiving structure, and a diameter of the screw rod portion is greater than a maximum outer diameter of the stud portion, the support screw sleeve is slidable along a direction of the central axis and is disposed on the screw rod portion, the screw cap portion is configured to stop the support screw sleeve from being away from the pressure receiving structure to limit the sliding range of the support screw sleeve.

18. The conducting device of claim 17, wherein the first elastic member is disposed in the accommodating cavity and is sleeved outside the locking screw, and the limiting sleeve is slidably disposed in the accommodating cavity, and the limiting sleeve is configured to press against the pressure receiving structure.

19. The conducting device of claim 18, wherein the inner wall of the accommodating cavity is provided with a second inner annular table, and the first elastic member is pressed against the support screw sleeve through the second inner annular table, the limiting portion is configured to transmit the elastic force of the first elastic member to the pressure receiving structure.

20. The conducting device of claim 19, wherein an outer wall of the screw rod portion is equipped with a screw outer annular table, the screw outer annular table is threaded with the second inner annular table, and the support screw sleeve comprises a first screw sleeve and a second screw sleeve, the first screw sleeve is detachably connected to the second screw sleeve, the accommodating cavity is formed between the first screw sleeve and the second screw sleeve, the first inner annular table is disposed on the first screw sleeve, and the second inner annular table is disposed on the second screw sleeve.

* * * * *